Feb. 18, 1969 M. WEBER 3,428,264
APPARATUS FOR PREPARING GRANULATES
Filed May 11, 1966 Sheet 1 of 2

INVENTOR
MAX WEBER

BY Erich M. H. Radde

AGENT

Feb. 18, 1969  M. WEBER  3,428,264
APPARATUS FOR PREPARING GRANULATES
Filed May 11, 1966
FIG. 2
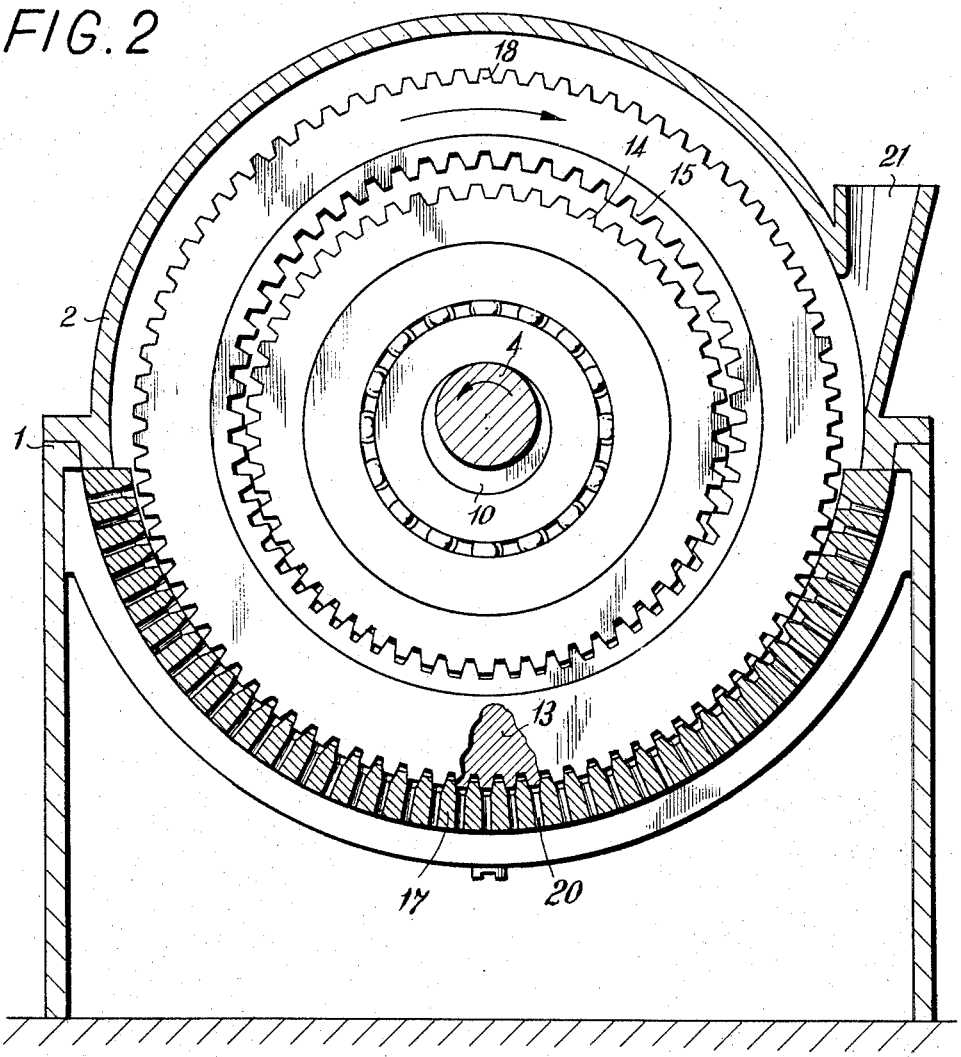
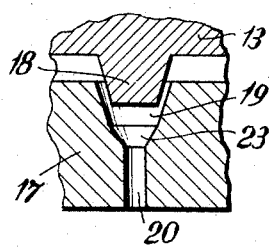
FIG. 3
INVENTOR
MAX WEBER
AGENT

United States Patent Office 3,428,264
Patented Feb. 18, 1969

3,428,264
APPARATUS FOR PREPARING GRANULATES
Max Weber, 118 Panoramastrasse,
69 Heidelberg, Germany
Filed May 11, 1966, Ser. No. 549,365
U.S. Cl. 241—90
Int. Cl. B02c 17/02, 13/00; B07b 13/00
4 Claims

ABSTRACT OF THE DISCLOSURE

The apparatus for preparing granulates from powdery, finely grained, doughy, or similar materials comprises:

(a) A stationary trough with recesses extending into outwardly extending tapering bores through which the material to be granulated is pressed, and (b) A roller mounted on an eccentric part of a drive shaft and rolling, on rotation of the drive shaft, in said trough so that conical projections provided on the cylindrical periphery of said roller engage in corresponding recesses of the trough. The roller may be provided at its axial ends (c) With gear wheels meshing planet wheel-like with gearing means firmly mounted in (d) The housing provided for the roller and the trough.

The apparatus has the advantage over known granulating devices that heat generation and air entrainment are considerably reduced.

---

The invention relates to an apparatus for preparing granulates from powdery, finely grained, doughy, or similar materials.

Many types of apparatus for this purpose are known. However, they all have inherent drawbacks which render clean and perfect operation difficult or virtually impossible. In one such apparatus, for example, the material to be granulated is engaged between two gear wheels revolving against one another, wherein the gear base of at least one gear wheel is perforated. In another such apparatus two perforated hollow rollers revolve against one another. Such apparatus have the disadvantage that the operation of at least two gear wheels or rollers delivers undesirable amounts of air into the actual compression zone, which causes turbulence of the usually pulverized material. Since, in addition, the gear wheels or rollers are operative over their entire width and therefore compact a substantial part of the powder which does not pass through the bores, high pressures are generated over a comparatively large surface. This necessitates in turn a heavy construction of the apparatus and particularly of the mountings of the shafts for the gear wheels or rollers. In addition, such construction brings about the danger that part of the powder is displaced laterally and forms compressed plates which cause wear on contacting metal surfaces. As a result thereof abrased metal particles contaminate such laterally displaced material.

It is one object of the present invention to provide a granulating apparatus which is free of the disadvantages of the known apparatus.

Other objects of the present invention and advantageous features thereof will become apparent as the description proceeds.

The apparatus according to the present invention for preparing granulates from powdery, fine-grained, doughy or similar materials comprises a roller provided with a plurality of conical projections on its cylindrical periphery. Said roller is mounted on an eccentric part of a drive shaft and may be so rotated and rolled in a fixed trough after the manner of a planetary gear that during rotation the conical projections engage in corresponding recesses which extend into tapering bores passing through the trough towards the outside, whereby the material to be granulated is pressed through the bores.

With this arrangement the roller may revolve in the trough in the opposite direction to the drive shaft, so that the material to be granulated is carefully treated because the cones on the roller engage in the recesses with a certain amount of clearance, reducing undesirable generation of heat and enabling entrained air to be evacuated. However, since there is only one revolving part, the probability of entrained air as in any case reduced considerably.

The invention will be further described by way of exaxmple with reference to the accompanying drawings in which:

FIG. 2 is a cross-section along the line II—II in FIG. 1.

FIG. 3 is a detail view to a larger scale showing a truncated cone engaging into a recess in the trough.

Like index numerals in said drawings indicate like parts of the apparatus.

Figure 1:
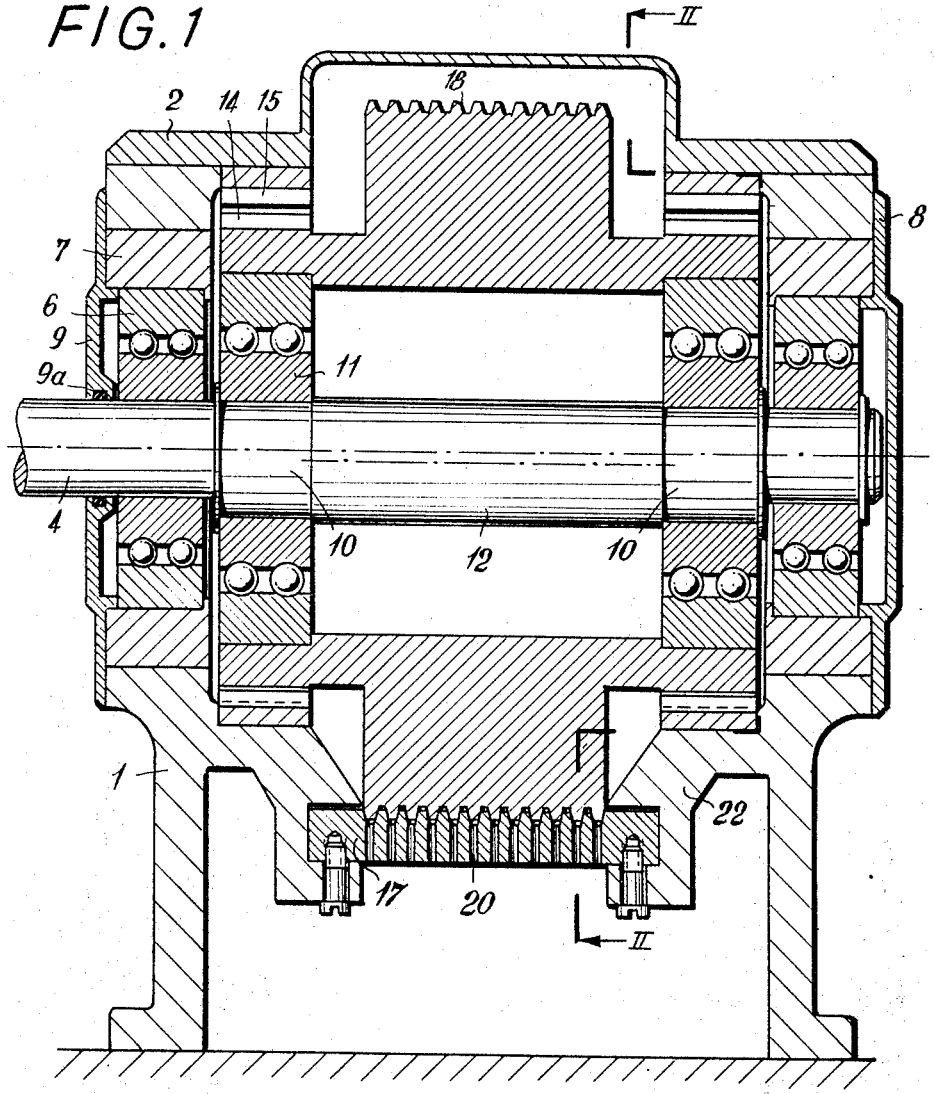
FIG. 1 is a longitudinal cross-section of the apparatus embodying the invention.

A divided housing comprises base portion 1 and cover portion 2. Shaft 4 is located in housing 1, 2. The shaft is mounted in ball bearings 6 which together with surrounding bush 7 are pressed into the housing from outside. The bearing remote from the drive is closed by cover 8. The bearing facing the drive is equipped with bearing plate 9 carrying shaft seal 9a. Shaft 4 has eccentric portions 10 which are adapted to receive roller 13 by means of ball bearings 11 located adjacent to center portion 12 of shaft 4. This roller 13 is provided with gear wheel 14 at each end of its cylindrical portion and each gear mates after the manner of a planet wheel with internally toothed gear ring 15, pressed into housing 1, 2, i.e., being firmly mounted in said housing.

The lower part of the housing comprises trough 17 of substantially semi-circular cross-section, whose center line is co-axial with that of gear ring 15.

If shaft 4 is driven by a motor and reduction gearing (not shown), roller 13 rolls once along the trough with each revolution of the shaft which in the embodiment shown, is in an anti-clockwise direction. During this revolution the roller rotates in the opposite direction since it is freely rotatable on eccentric portions 10 and gear wheels 14 mesh with gear rings 15.

Roller 13 is equipped on its cylindrical periphery with equidistantly spaced conical projections 18 of substantially square cross-section which may be machined by milling or the like from the solid surface of the roller, or may be in the form of pins screwed into the smooth roller surface. Trough 17 is equipped with recesses 19 corresponding in size and shape to projections 18. These recesses 19 extend into bores 20 leading to outside the trough. If a powder to be granulated is filled into hopper 21 mounted in part 2 of the housing, it will drop into the granulating zone, is captured by roller 13 rolling along gear rings 15 and is pressed by projections 18 entering into recesses 19, causing it to be compressed. Then it is pressed through tapering conical parts 23 into bores 20. It leaves these bores as finished granulate and may be stripped from the outside of trough 17. Lateral escape of the material is prevented by side walls 22 which are inclined downwardly towards the trough.

Both the trough and the roller can be easily changed if necessary, so that the same apparatus may be used for making granulates of different sizes. In addition the trough may be surrounded by a heating or cooling jacket in order to affect the granulating process favorably one way or the other.

If, during granulating, the material to be granulated accumulates undesirably between the surfaces of individual bores 19 in trough 17 and does not flow into the bores, said bores 19 may be countersunk to such a degree that their inner edges overlap with those of adjacent bores, and result with these in a sharp cutting edge, whereby the flow of the material is facilitated under all conditions.

Of course many changes and variations may be made in the construction of the granulating apparatus according to the present invention in accordance with the principles set forth herein and in the claims annexed hereto.

I claim:

1. Apparatus for preparing granulates from powdery, finely grained, doughy or similar material, said apparatus comprising a stationary trough, said trough being provided with recesses extending into tapering bores passing through the trough towards the outside, a roller, said roller being provided with a plurality of conical projections on its cylindrical periphery and being mounted on an eccentric part of a drive shaft, said roller, on rotation of the drive shaft, rolling in said trough after the manner of a planetary gear so that the projections of the roller engage in the corresponding recesses of the trough.

2. Apparatus according to claim 1, in which a roller is provided having at each axial end a gear wheel meshing in the manner of a planet wheel with a gearing firmly mounted in the housing provided for said roller and said trough.

3. Apparatus according to claim 2, in which the gearing consists of gear rings and in which the trough has a semi-circular cross-section whose center line is substantially co-axial with that of said gear rings.

4. Apparatus according to claim 3, in which the trough is exchangeable.

References Cited

UNITED STATES PATENTS

| | | | |
|---|---|---|---|
| 220,111 | 9/1879 | Baker | 241—214 |
| 326,853 | 9/1885 | Cormack | 241—95 |
| 759,221 | 5/1904 | Allen | 241—191 |
| 1,021,233 | 3/1912 | Beach et al. | 241—207 |
| 1,972,666 | 9/1934 | Pays | 241—90 |

GERALD A. DOST, *Primary Examiner.*

U.S. Cl. X.R.

241—191, 208, 254, 280